(12) United States Patent
Giacobbe et al.

(10) Patent No.: US 7,567,965 B2
(45) Date of Patent: Jul. 28, 2009

(54) PRESENTING MESSAGE ATTACHMENTS INDEPENDENT OF ELECTRONIC MESSAGES AT A USER-INTERFACE

(75) Inventors: Gail Borod Giacobbe, Seattle, WA (US); Bryan T. Starbuck, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 384 days.

(21) Appl. No.: 10/971,403

(22) Filed: Oct. 22, 2004

(65) Prior Publication Data

US 2006/0089931 A1    Apr. 27, 2006

(51) Int. Cl.
*G06F 7/00* (2006.01)
*G06F 17/30* (2006.01)

(52) U.S. Cl. .......................... 707/9; 715/205
(58) Field of Classification Search ......... 709/202–207; 707/205

See application file for complete search history.

(56) References Cited

U.S. PATENT DOCUMENTS

| | | | | |
|---|---|---|---|---|
| 5,781,901 A * | 7/1998 | Kuzma | ......................... | 707/10 |
| 5,794,039 A | 8/1998 | Guck | | |
| 6,324,569 B1 | 11/2001 | Ogilvie | | |
| 6,430,174 B1 | 8/2002 | Jennings | | |
| 6,430,177 B1 | 8/2002 | Luzeski | | |
| 6,487,278 B1 | 11/2002 | Skladman | | |
| 6,493,703 B1 | 12/2002 | Knight et al. | ................... | 707/3 |
| 6,778,642 B1 | 8/2004 | Schmidt | | |
| 6,816,885 B1 * | 11/2004 | Raghunandan | .............. | 709/206 |
| 6,990,513 B2 | 1/2006 | Belfiore | | |
| 7,003,551 B2 * | 2/2006 | Malik | ......................... | 709/206 |
| 7,194,516 B2 * | 3/2007 | Giacobbe et al. | ............ | 709/206 |
| 7,296,058 B2 * | 11/2007 | Throop | ....................... | 709/206 |
| 2001/0054073 A1 * | 12/2001 | Ruppert et al. | .............. | 709/206 |
| 2002/0013817 A1 * | 1/2002 | Collins et al. | ............... | 709/206 |
| 2002/0065892 A1 * | 5/2002 | Malik | ......................... | 709/206 |
| 2002/0145057 A1 * | 10/2002 | Leedy et al. | ................ | 239/310 |
| 2003/0018644 A1 | 1/2003 | Bala et al. | .................... | 707/100 |
| 2003/0018721 A1 | 1/2003 | Gupta | | |
| 2003/0093565 A1 * | 5/2003 | Berger et al. | ................ | 709/246 |
| 2004/0111302 A1 | 6/2004 | Falk | | |

(Continued)

OTHER PUBLICATIONS

Achieving Service Portability Using Self-Adaptive Data Paths Zhuoqing, M.M. Katz, R. California University, Berkeley, C.A. Jan. 2002.

(Continued)

*Primary Examiner*—Hosain T Alam
*Assistant Examiner*—Azam Cheema
(74) *Attorney, Agent, or Firm*—Workman Nydegger

(57) ABSTRACT

The present invention extends to methods, systems, computer program products, and data structures for presenting message attachments independent of electronic messages at a user-interface. A message application submits a query for message related data that satisfies query criteria. A database application receives the query and identifies a message attachment that satisfies the query criteria. The database application returns a message attachment link to the message attachment in response to the query. The message attachment link provides access to the message attachment independent of an electronic message that included the message attachment. The message application receives the message attachment link. The message application presents the message attachment link at a user-interface independent of the electronic message such that the message attachment can be accessed without first accessing the electronic message.

29 Claims, 7 Drawing Sheets

U.S. PATENT DOCUMENTS

| | | | |
|---|---|---|---|
| 2004/0133645 A1* | 7/2004 | Massanelli et al. | 709/206 |
| 2004/0143569 A1* | 7/2004 | Gross et al. | 707/3 |
| 2004/0203664 A1 | 10/2004 | Lei | |
| 2004/0237042 A1 | 11/2004 | Murray et al. | 715/530 |
| 2005/0060317 A1 | 3/2005 | Lott et al. | 707/10 |
| 2005/0060375 A1* | 3/2005 | Ernest et al. | 709/206 |
| 2005/0102361 A1 | 5/2005 | Winjum | |
| 2005/0108332 A1* | 5/2005 | Vaschillo et al. | 709/206 |
| 2005/0246423 A1 | 11/2005 | Starbuck | |
| 2006/0095527 A1* | 5/2006 | Malik | 709/206 |

OTHER PUBLICATIONS

University Inbox: Providing Extensible Personal Mobility And Service Mobility In An Integrated Communication Network Raman, B. Katz, R.H. Joseph, A.D. Div. of Comput. Sci., California University, Berekeley, C.A. 2000.

U.S. Appl. No. 10/692,201, filed Oct. 23, 2003, Giacobbe.

U.S. Appl. No. 10/971,403, filed Oct. 22, 2003, Giacobbe.

U.S. Appl. No. 10/835,822, filed Apr. 30, 2004, Starbuck.

Office Action mailed Aug. 2, 2007 in related U.S. Appl. No. 10/693,547.

Cruz, Irving De la, et al., "Inside MAPI", Microsoft Press, Copyright 1996, pp. 548-559.

Thurston, M.G., An Open Standard for Web-Based Condition-Based Maintenance Systems, IEEE 2001, Appl. Res. lab., Pennslyvania State Univ., University park, PA.

Greg Eisenhauer, Karsten Schwan, Patrick Widner, Open Metadata Formats: Efficient XML-Based Communication for Heterogneous Distributed Systems, College of Computing, Georgia Institute of Technology, Atlanta GA 30332-0280, IEEE 2001.

Office Action dated May 22, 2008 cited in related U.S. Appl. No. 10/971,403.

Notice of Allowance dated Oct. 11, 2006 cited in related U.S. Appl. No. 10/692,201.

Notice of Allowance dated Jun. 13, 2008 cited in related U.S. Appl. No. 10/693,547.

* cited by examiner

PRESENTING MESSAGE ATTACHMENTS INDEPENDENT OF ELECTRONIC MESSAGES AT A USER-INTERFACE

CROSS-REFERENCE TO RELATED APPLICATIONS

Not applicable

BACKGROUND OF THE INVENTION

1. The Field of the Invention

The present invention relates to presenting electronic messaging data and, more particularly, to presenting message attachments independent of electronic messages at a user-interface.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, web browsing) include electronic communication between a number of computer systems and/or other electronic devices via wired and/or wireless computer networks.

In particular, electronic messaging has become an important method for communicating. Computer system users often send and receive electronic messages (e.g., electronic mail messages, instant messages, faxes, news group postings, etc.,) to exchange information with one another. For example, to create an electronic mail message, a sending user typically selects a new message option from within an electronic mail application. In response to the selection, the electronic mail application displays one or more fields (e.g., a To field, a Body field, etc.) that can receive user entered data. The sending user then enters data (e.g., at a keyboard) into the displayed fields. When appropriate, the sending user can save the electronic mail message as a draft or send the electronic mail message to a recipient user (e.g., by selecting the appropriate "save" or "send" control within the electronic mail application).

Sending the electronic mail message may cause the electronic mail message to be routed from the sending user's computer system, through a sending mail server, across a network, to a receiving mail server that stores electronic mail messages for a recipient user. To view the electronic mail message, the recipient user establishes a connection from an electronic mail application to the receiving mail server. Establishing the connection can cause all electronic mail messages sent to the recipient user, including the mail message from the sending user, to be transferred from the receiving mail server to the recipient user's computer system and stored at the recipient user's computer system. After the electronic mail message from the sending user is transferred and stored, the recipient user may manipulate an input device, such as, for example, a mouse, within the electronic mail application to view the stored electronic mail message.

Electronic messages are also frequently used to send files (word processing documents, pictures, etc) from one user to another. A user desiring to send a file can attach the file to an electronic message. When the electronic message is transferred, the attached file is transferred along with the electronic message. Thus, it may be that an electronic message includes a message body (e.g., text included in an electronic mail message) and an attachment (or attachments).

There is typically a reasonably tight coupling between an electronic message and any included attachments. Thus, when an electronic message including an attachment is received at recipient's computer system, the attachment is stored along with the message body at the recipient's computer system. Further, when the electronic message is moved to a different storage location or deleted, the attachment is typically also correspondingly moved to the storage location or deleted. Coupling attachments and electronic messages can allow a user to easily manipulate the electronic message and attachment together.

When viewing an electronic message that includes attachments, an icon (e.g., a paper clip) representing the attachment is typically presented along with the message body at a user-interface. Accordingly, the recipient can then select the icon to access or launch the attachment. The recipient can also save a copy of the attachment to location on a mass storage device associated with the recipient's computer system. Unfortunately, if for some reason a user does not save an attachment before deleting a corresponding electronic message, it can be difficult, if not impossible, to recover the attachment.

However, attachments are typically not modeled as first class objects. Thus, to access an attachment, the recipient is typically forced to first access an electronic message that includes the attachment. That is, there is typically no mechanism for presenting an attachment at a user-interface independent of an electronic message that includes the attachment.

Further, it is often difficult to locate attachments. For example, a saved attachment may be stored in an obscure location used by an electronic messaging application. Additionally, even when an attachment can be located, presentation of an attachment at a user-interface typically does not provide any metadata associated with the attachment. For example, viewing an attachment at a user-interface typically does not provide any indication of the entity that sent the attachment or any indication of what the attachment relates to. Therefore systems, methods, computer program products, and data structures for presenting message attachments independent of electronic messages at a user-interface would be advantageous.

BRIEF SUMMARY OF THE INVENTION

The foregoing problems with the prior state of the art are overcome by the principles of the present invention, which are directed towards methods, systems, computer program products, and data structures for presenting message attachments independent of electronic messages at a user-interface. A message application submits a query for message related data that satisfies query criteria. A database application receives the query and identifies a message attachment that satisfies the query criteria. The database application returns a message attachment link to the message attachment in response to the query. The message attachment link provides access to the message attachment independent of an electronic message that included the message attachment. The message application receives the message attachment link. The message application presents the message attachment link at a user-interface independent of the electronic message such that the message attachment can be accessed without first accessing the electronic message.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
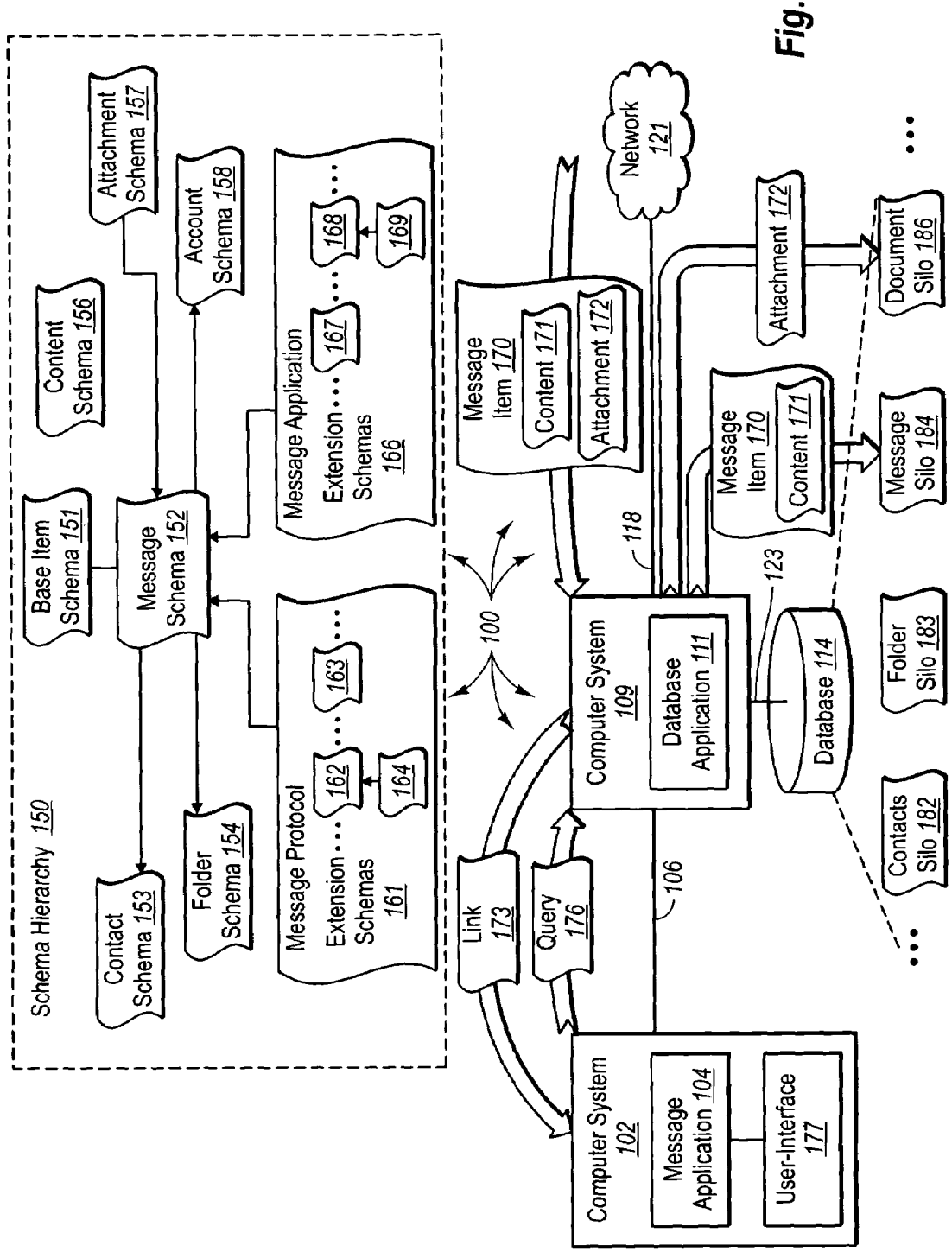
FIG. 1 illustrates an example of a network architecture and general schema hierarchy that facilitate presenting a message attachment independent of electronic messages at a user-interface.

The principles of the present invention provide for presenting message attachments independent of electronic messages at a user interface. A message application submits a query for message related data that satisfies query criteria. A database application receives the query and identifies a message attachment that satisfies the query criteria. The database application returns a message attachment link to the message attachment in response to the query. The message attachment link providing access to the message attachment independent of an electronic message that included the message attachment. The message application receives the message attachment link. The message application presents the message attachment link at a user-interface independent of the electronic message such that the message attachment can be accessed without first accessing the electronic message.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, a "schema" is defined as an expression of a shared vocabulary between a plurality of computer systems that allows the plurality of computer systems to process documents according the expressed shared vocabulary. For example, an eXtensible Markup Language ("XML") schema can define and describe a class of XML documents using schema constructs (e.g., name/value pairs) of an XML schema language. These schema constructs can be used to constrain and document the meaning, usage, and relationships of data types, elements and their content, attributes and their values, entities and their contents, and notations, as used in XML documents. Thus, any computer system that can access an XML schema can process XML documents in accordance with the XML schema. Further, any computer system that can access an XML schema can compose or modify XML documents for use by other computer systems and/or message processors that can also access the XML schema.

Schema is defined to include Document Type Definitions ("DTD"), such as, for example, DTD files ending with a ".dtd" extension. Schema is also defined to include World Wide Web Consortium ("W3C") XML Schemas, such as, for example, XML Schema files ending with an ".xsd" extension. However, the actual file extension for a particular DTD or XML schema is not important. A schema can be utilized to define virtually any data type including logical, binary, octal, decimal, hexadecimal, integer, floating-point, character, character string, user-defined data types, and combinations of these data types used to defined data structures. Some examples of user-defined data types are DateTime data types representing date and time data and EAddress data types representing electronic addresses data, such as, for example, telephone numbers, electronic mail address, instant message addresses, etc., A schema can also be defined to reference or link to other schemas in a schema hierarchy.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a network architecture 100 and general schema hierarchy 150 that facilitate presenting a message attachment independent of electronic messages at a user-interface. Network architecture 100 includes computer system 102, computer system 109, database 114, and network 121. Computer system 102 and computer system 109 are connected by corresponding link 106. Computer system 102 and computer system 109 can exchange electronic messages (e.g., electronic mail messages, instant messages, fax messages, news group postings, voice messages, etc.) over link 106. For example, it may be that computer system 109 is a messaging server that stores electronic messages. From time to time computer system 102 may connect to computer system 109 to download electronic messages.

Computer system 109 is connected to database 114 by link 123. Database 114 can be a database that stores a plurality of different types of database items. For example, contacts silo 182 can store contact items representing contacts (e.g., individual, organizations, or corporations), folder silo 183 can store folder items representing folders that store other types of items (e.g., electronic messages), message silo 184 can store message items representing electronic messages, document silo 186 can store document items representing various documents, etc. Document silo 186 can be stored message attachments (e.g., attachment 172) that are received along with corresponding electronic messages (e.g., message item 170). Database items stored in database 114 can include data fields defined in accordance with the schemas of schema hierarchy 150. A series of three periods (an ellipsis) before contacts silo 182 and after document silo 186 indicates that other silos (potentially storing other different types database items) can be included in database 114.

Computer system 109 is connected to network 121 by link 118. Network 121 can be a Local Area Network ("LAN"), Wide Area Network ("WAN"), or even the Internet. Computer system 109 can receive data from and send data to other computer systems connected to network 121 over link 118. Computer system 102, computer system 109, and possibly other computer systems connected to network 121 can have access to schemas included in schema hierarchy 150.

Schema hierarchy 150 generally represents data formats for defining electronic messages. Message items representing electronic messages (as well as other types of items in database 114) can be defined in accordance with base item schema 151. Generally, a base item schema can define data formats for data fields (e.g., a globally unique ID and display name) used to differentiate one database item from another database item. Accordingly, message items stored in message silo 184 (as well as items stored contacts silo 182, folder silo 183, and document silo 186) can include one or more data fields defined in accordance with base item schema 151.

Message schema 152 defines data formats for one or more data fields (e.g., message subject, message size, etc.) that are common to a plurality of different types of electronic messages (e.g., electronic mail message, instant message, news group posting, blog entry, fax message, voice mail message, etc). Accordingly, message items stored in message silo 184 can include one or more data fields defined in accordance with message schema 152. Message schema 152 can define data fields that refer or linked to data fields defined in accordance with other schemas in schema hierarchy 150.

For example, message schema 152 can define one or more data fields that refer or link to contact related information (having data fields defined in accordance with contact schema 153) in contacts silo 182. Accordingly, a message item defined in accordance with message schema 152 can refer or link to contacts related information in silo 182. Referring to or linking to contact related information can indicate that the entity corresponding to the contact related information is associated with the message item. Similarly, message schema 152 can define one or more data fields that refer or link to a folder related information (having data fields defined in accordance with contact schema 153) in folders silo 183. Accordingly, a message item defined in accordance with message schema 152 can also refer or link to folder related information in folder silo 183. Referring to or linking to a folder related information can indicate that the message item is stored in a folder corresponding to the folder related data.

Likewise, message schema 152 can define one or more data fields that refer to link to document related information. Accordingly, a message item defined in accordance with schema 152 can include one or more attachments (having data fields defined in accordance with attachment schema 157) that refer to link to document related data in document silo 186. Referring to or linking to document related data can indicate that the documents corresponding to the document related data was an attachment to the message item. Further, a message item defined in accordance with message schema 152 can refer or link to account related data defined in accordance with account schema 158. The content of a message item (e.g. a message body or message attachment) can include data fields defined in accordance with content schema 156.

A message item defined in accordance with schema 152 can also include data fields defined in accordance with one or more message extension schemas. Some message extension schemas can be protocol extensions that promote compatibility with specified message protocols. For example, message protocol extension schemas 161 can contain one or more message protocol extension schemas defining data fields that are specific to particular message protocols. For example, protocol extension schema 162 can define data formats for one or more data fields specific to a first message protocol (e.g., Network News Transfer Protocol ("NTTP")) and protocol extension schema 163 can define data formats for one or more data fields specific to a second message protocol (e.g., Post Office Protocol ("POP")). Protocol extension schemas can be arranged hierarchy. For example, protocol extension schema 164 can define data formats for additional data fields specific to a particular implementation of the first message protocol (having data fields defined in accordance with protocol extension schema 162).

Other message extensions can be application extensions that promote compatibility with specified message applications. For example, message application extension schemas 166 can contain one or more message application extension schemas defining data fields that are specific to message applications. For example, application extension schema 167 can define data formats for one or more data fields specific to a first message application (e.g., an electronic mail application) and application extension protocol schema 168 can define data formats for one or more data fields specific to a second message application (e.g., fax application). Application extension schemas can be arranged hierarchy. For example, application extension schema 169 can define data formats for additional data fields specific to a particular version of the second message application (having data fields defined in accordance with application extension schema 168).

Accordingly, an electronic message can have some fields in common with other electronic messages and some fields that differ from other electronic messages. That is, a message item having data fields defined in accordance with message schema 152 can also have additional data fields defined in accordance with any of the extension schemas in message protocol extension schemas 161 and message application extension schemas 166. Data fields corresponding to message extensions can be "snapped" on to and removed from message items as appropriate to facilitate compatibility with existing message protocols and message applications. Accordingly, the configuration of data fields contained in a message item can change over time. Having some commonly defined fields and other differently defined fields promotes efficient storage and access of electronic messages, while also facilitating message compatibility with existing message protocols and message applications.

An application, such as, for example, application 111 (a database interface module), may request that data fields of a particular protocol extension schema or application extension schema be snapped on to or removed from a message item before accessing the message item. Thus, it may be that a message item is transformed for compatibility with a particular message protocol or message application. For example, application 111 may request that fields of the NNTP protocol extension schema be snapped onto message item 170. Accordingly, application 111 can retrieve message item 170 and transform message item 170 to include data fields (e.g., defined in accordance with protocol extension schema 162) that promote compatibly with the NNTP protocol. The transformed message item can then be transferred to computer system 102 or stored in database 114.

Figure 2:
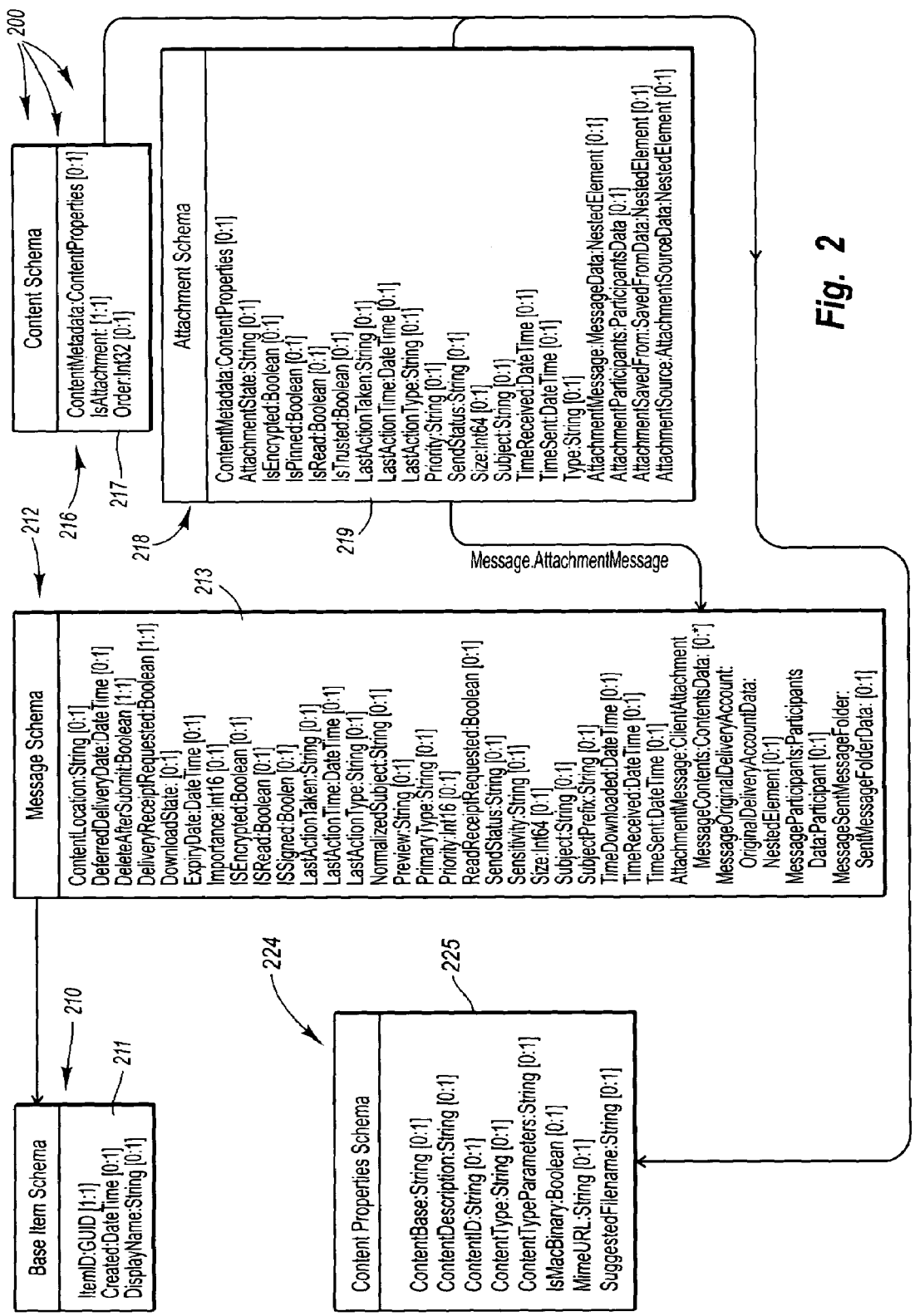
FIG. 2 illustrates an example portion of a more detailed schema hierarchy in accordance with the principles of the present invention.

FIGS. 2 illustrate an example portion of a more detailed schema hierarchy 200 in accordance with the principles of the present invention. Depicted in FIG. 2, schema hierarchy 200 includes base item schema 210. Base item schema 210 includes interrelated fields 211 that define data formats for representing base item data. More specifically, interrelated fields 211 can define data formats as described in Table 1.

TABLE 1

| Field Name | Field Data Type | Field Description |
| --- | --- | --- |
| ItemID | GUID | Defines a format for representing a globally unique identifier for a database item. |
| Created | DateTime | Defines a format for indicating the date and time a database item, having a globally unique identifier defined in accordance with the ItemID field, was created. |
| DisplayName | String | Defines a format for indicating a descriptive name for a database item having a globally unique identifier defined in accordance with the ItemID. |

Depicted in FIG. 2, schema hierarchy 200 includes message schema 212. Message schema 212 derives from base item schema 210 and also includes interrelated fields 213 that define data formats for representing a message item. The fields of message schema 212 can be applied to a base item having a globally unique identifier (defined in base item schema 210) to cause the base item to exhibit the properties of a message item. More specifically, interrelated fields 213 can define data formats as described in Table 2.

TABLE 2

| Field Name | Field Data Type | Field Description |
| --- | --- | --- |
| ContentLocation | String | Defines a format for representing referenced content from a message's Content-Location header. This field can be used along with the base Content-Location. Some attachments will have relative Content-Locations to this Content-Location. |
| DeferredSend Time | DateTime | Defines a format for representing the date and time when the message is to be delivered. |
| DeleteAfter Submit | Booelan | Defines a format for indicating whether the message should be deleted after being submitted for delivery. |
| DownloadState | String | Defines a format for representing the different phases of downloading the message from the server. Partial, etc. |
| ExpiryDate | DateTime | Defines a format for representing the date and time when the content of the message expires. In general, no automatic action is implied. |
| Importance | Int16 | Defines a format for representing the message sender's opinion of the importance of the message. Corresponds with the "Importance:" field in SMTP. Possible values are 1 ("Low"), 2 ("Normal"), and 3 |

TABLE 2-continued

| Field Name | Field Data Type | Field Description |
|---|---|---|
| | | ("High"). The default value for new messages is 2 ("Normal"). |
| IsEncrypted | Boolean | Defines a format for indicating if the message is encrypted. |
| IsRead | Boolean | Defines a format for indicating if the message has been marked as read by the user. |
| IsSigned | Boolean | Defines a format for indicating if the message has been signed. |
| LastActionTaken | String | Defines a format for representing the last action taken on the message. Possible values are: Replied and Forwarded. |
| LastActionTime | DateTime | Defines a format for representing the date and time at which the last action was taken on the message. |
| LastActionType | String | Defines a format for representing the type of last action taken on this message. Should be interpreted together with LastActionTaken. Examples are: Fax or Email to mark that we replied by fax or email. |
| NormalizedSubjet | String | Defines a format for representing the normalized subject of the message. The NormalizedSubject is the part the subject following the prefix. If there is no prefix, NormalizedSubject is the same as the subject. |
| Preview | String | Defines a format for representing a preview of the message. The preview property can contain the first few characters of the main message body, or some representation of it that will be used for previewing the message. This is cache-optimization field. It is calculated form the bodies and is put here for fast retrieval in preview scenarios. It is text only field and is not mandatory. |
| PrimaryType | String | Defines a format for representing a message type (e.g., Email, FaxMessage, InstantMessage, VoiceMessage, MeetingRequest, etc.) associatd with the message. The message type will imply behavior of the message. Applications can customize icons and read custom headers based on the message type. This value can come from the X-MessageType header. |
| Priority | Int16 | Defines a format for representing a message priority for the message. Message priority for delivery as set by application. Values: AboveNormal = 3, Normal = 2, BelowNormal = 1. Higher values indicate that a transport should deliver it sooner than messages of a lower level. |
| ReadReceipt Requested | Boolean | Defines a format for indicating if read receipt has been requested for this message. |
| SendStatus | String | Defines a format for representing a send status of the message. "ToSend": Compose UI marks this way for transports to pick up. "Sending": A transport transitions from "ToSend" to "Sending" so other transports won't also attempt to send the message. "Sent": The transport transitions from "Sending" to "Sent" after the send is complete. |
| Sensitivity | String | Defines a format indicating the message sender's opinion of the sensitivity of the message. Corresponds with the "Sensitivity:" field in SMTP. Possible values are: None (no special sensitivity), Personal, Private, or Company-Confidential. The default value for new messages is None. |
| Size | Int64 | Defines a format for representing the calculated size of the message in bytes. This includes the entire message with body, header and attachments. The can be missing if the size is unknown. |
| Subject | String | Defines a format for representing the subject of the message. For example, one line that describes the topic of the message. This field is calculated from NormalizedSubject and SubjectPrefix. Subject of the message. Subject can be computed from the Subject and SubjectPrefix values in the following manner: (1) If SubjectPrefix is present, Subject is set to the contents of the NormalizedSubject with the prefix prepended. (2) If SubjectPrefix is not present, NormalizedSubject is copied to Subject. |
| SubjectPrefix | String | Defines a format for representing a SubjectPrefix of the message. Consists of one or more alphanumeric characters, followed by a colon and a space (which are part of the prefix). The subject |

TABLE 2-continued

| Field Name | Field Data Type | Field Description |
|---|---|---|
| | | prefix may be absent. If SubjectPrefix is set express;y, it can be of any length and use any alphanumeric characters and can match a substring at the beginning of the subject. If SubjectPrefix is not expressly set and must be computed by, its contents can be more restricted. One possible rule for computing the prefix is that the subject begin with one, two, or three letters (alphabetic only) followed by a colon and a space. If such a substring is found at the beginning of the subject, it then becomes SubjectPrefix (and also stays at the beginning of the Subject field). Otherwise SubjectPrefix remains unset. |
| TimeDownloaded | DateTime | Defines a format for representing the date and time the message was downloaded from the server. |
| TimeReceived | DateTime | Defines a format for representing the date and time the message was delivered. The TimeReceived property describes the time the message was received by the server, rather than the time the message was downloaded from the server and placed in the local WinFS store. This value can be omitted on draft messages and retained copies of send messages. |
| TimeSent | DateTime | Defines a format for representing the date and time the message sender submitted the message. On draft messages this value can be omitted-it will be set when the message is submitted. |
| Attachment Message | Attachment | Defines a format for representing a link to attachment data corresponding to the message. The attachment data can be defined in accordance with an attachment schema. |
| MessageContents | ContentsData | Defines a format for representing link to a portion of message content corresponding to the message. The portion of message content can be defined in accordance with a content schema. |
| MessageOriginal DeliveryAccount | OriginalDelivery AccountData | Defines a format for representing a link to original delivery account data corresponding to the message. The original delivery account data can be defined in accordance with an account schema. |
| Message Participants | ParticipantsData | Defines a format for representing a link to contact data corresponding to the message. Contact data can be defined in accordance with a contact schema. The contact data can represent a collection of users who participated in the message exchange. This includes, senders, receivers, people copied (Cc), etc. A participant is a link to the Contact Item representing message sender/receiver. May be left dangling in which case the fields on this type contain all the necessary data about the participant. |
| MessageSentMessageFolder | SentMessage FolderData | Defines a format for representing a link to a folder item corresponding to the message. The folder item can be defined in accordance with a Folder Schema. This field specifies a link to a folder the message can be moved to after being submitted for delivery. |

Depicted in FIG. 2, schema hierarchy 200 includes content schema 216. Content schema 216 includes interrelated fields 217 that define data formats for representing a portion of content associated with a message item. A message item defined in accordance with message schema 212 can include a link to a portion of content (e.g., a body or attachment) defined in accordance with content schema 216. This can be a link to a document, an event, or some other portion of content. A message item can have multiple bodies and/or attachments. For example, a multipart MIME message can contain multiple bodies. More specifically, interrelated fields 217 can define data formats as described in Table 3.

TABLE 3

| Field Name | Field Data Type | Field Description |
| --- | --- | --- |
| ContentMetadata | ContentProperties | Defines a format for representing content properties of a portion of content (e.g., a message body or attachment). ContentProperty types contain fields that describe the content of a message. It is on a relationship between message and item representing content of on extension for attachment. |
| IsAttachment | Booelan | Defines a format for indicating whether the portion of content referred to is a body, or attachment for a message. This field represents what the application thinks this content is as opposed to the ContentDisposition field which is a suggestion from MIME. |
| Order | Int32 | Defines a format for representing an order for the portion of content. This value provides an order to the bodies and attachments. User interfaces should take this value into consideration when displaying the order of the attachments to the user. The first body can be the preferred one. |

Depicted in FIG. 2, schema hierarchy 200 includes attachment schema 218. Attachment schema 218 includes interrelated fields 219 that define data formats for representing an attachment associated with of a message item. An attachment defines in accordance with attachment schema 218 can include a link to a message item defined in accordance with message schema 212. More specifically, interrelated fields 219 can define data formats as described in Table 4.

TABLE 4

| Field Name | Field Data Type | Field Description |
| --- | --- | --- |
| ContentMetadata | ContentProperties | Defines a format for representing content properties of an attachment. ContentProperty types contain fields that describe the attachment. It is on a relationship between message and item representing content on extension for attachment. |
| AttachementState | String | Defines a format for indicating the type and behavior of the attachment. Values can include: 1) EnclosedAttachment: This value indicates an attachment that is stored decoded outside of the Mime. The attachment will behave as if it is enclosed within the Mime Stream. This database Item was created because the data is to be stored in decoded form or the properties need to be schematized. The two most common scenarios that require this are: A. Some protocols will download attachments outside of the MIME content in decoded form. B. The attachment data or meta properties need to be accessible, but this attachment may not behave as if the sender attached this document/file for the recipient to use directly. Examples include: Signature blobs, Inline Only Attachments, Digital Signature certs or data. 2) PromotedAttachment: This attachment is promoted to act like a peer of the message. It will appear in the shell along side the message. 3) SavedAsAttachment: This attachment has be 'Saved As', so it will act as a copy of the message. |
| Is Encrypted | Boolean | Defines a format for indicating if the attachment is encrypted. |
| IsPinned | Boolean | Defines a format for indicating if the attachment is pinned, meaning it will continue to exist when the message is deleted. If the attachment is not pinned, the following can happen: 1. When the Message is deleted, the Attachment is deleted. (The destination of the AttachmentInformation.Attachment link.) 2. When the Attachment item is deleted, any information or metadata associated with the Attachment is deleted from the message. (To save space or for privacy) |

TABLE 4-continued

| Field Name | Field Data Type | Field Description |
|---|---|---|
| IsRead | Boolean | Defines a format for indicating if a message linked to the attachment has been marked as read by the user. |
| IsSigned | Boolean | Defines a format for indicating if a message linked to the attachment is signed. |
| IsTrusted | Booelan | Defines a format for indicating if a message linked to the attachment has satisfied the user's security preferences to appear along with their other files. If security preferences are satisfied, the attachment has met the user's criteria to not need to display warning user interface. The criteria could be: the attachment content, the sender is approved, or user interface as already been displayed. On the other hand, if security preferences are not satisfied, a security preferences warning user interface should be shown to the user before the attachment is opened. This will inform the user that the content could have came from an untrusted source and may contain harmful contents. |
| LastActionTaken | String | Defines a format for representing the last action taken on a message linked to the attachment. Possible values are: Replied and Forwarded. |
| LastActionTime | DateTime | Defines a format for representing the date and time the last action was taken on a message linked to the attachment. |
| LastActionType | String | Defines a format for representing the type of last action taken on one a message linked to the attachment. Should be interpreted together with LastActionTaken. Examples are: Fax or Email to mark that we replied by fax or email. |
| Priority | String | Defines a format for representing the priority of a message linked to the attachment. Attachment priority for delivery can be set by application. Possible Values: AboveNormal, Normal, BelowNormal. Higher values indicate that a transport should deliver attachment sooner than items of a lower level. |
| SendStatus | String | Defines a format for representing the send status of the attachment. For example, a UI can mark the attachment "ToSend" for transports to pick up. A UI can mark the attachment as "Sending" indicating a transition from "ToSend" to "Sending" so other transports won't also attempt to send the message. A UI can mark an attachment as "Sent": The transport transitions from "Sending" to "Sent" after the send is complete. |
| Size | Int64 | Defines a format for representing the size of a message (including attachments) linked to the attachment. |
| Subject | String | Defines a format for representing the subject of a message linked to the attachment. For example, one line that describes attachment. |
| TimeReceived | DateTime | Defies a format for representing the date and time the attachment was delivered. The TimeReceived property describes the time a message linked to the attachment was received by the server, rather than the time the attachment was downloaded from the server and placed in the local database store. This value can be omitted on draft messages and retained copied of send messages. |
| TimeSent | DateTime | Defines a format for representing the date and time a message linked to the attachment was submitted. On draft messages this value can be missing —it will be set when the message is submitted. |
| Type | String | Defines a format for representing the type of a message linked to the attachment. The type will imply a behavior of the linked message. The application can customize icons and read custom headers based on the attachemnt type. This value can come from the X-MessageType header. |
| Attachment Message | MessageData | Defines a format for representing a link to a message item associated with the attachment. |

TABLE 4-continued

| Field Name | Field Data Type | Field Description |
|---|---|---|
| Attachment Participants | ParticipantsData | The message item can be defined in accordance with a message schema. Defines a format for representing a collection of users who participated in this attachment exchange. This includes, senders, receivers, people copied (Cc), etc. |
| AttachmentSaved From | SavedFromData | Defines a format for representing a link to allocation the attachment was saved from. Users may use a User Interface to 'Save As' a copy of the attachment. Doing so can make a copy of the attachment. If this value is included, then the attachment is a 'Saved As' copy of an original attachment. The destination of this link is the original attachment. |
| AttachmentSource | AttachmentSource Data | Defines a format for representing the source of the attachment. If the attachment was composed and this link is has a value, then the link points to the database item where the attachment came from. |

Content metadata (e.g., as defined in accordance with a ContentProperties field) associated with an attachment can indicate properties of the electronic message that included the attachment, such as, for example, the sender, recipients, subject, or data of an electronic message or other properties as defined in a content properties schema. A value of an IsPinned field can indicate if an attachment, for example, defined in accordance with attachment schema 218, is to persist after a corresponding message item is deleted.

Depicted in FIG. 2, schema hierarchy 200 includes content properties schema 224. Content properties schema 224 includes interrelated fields 225 that define data formats for representing content properties. Content properties contain fields that describe the content of a message. Content properties are used on relationships between a message item and a portion of content (e.g., defined in accordance with content schema 216) or on extension for an attachment (e.g., defined in accordance with attachment schema 218). More specifically, interrelated fields 225 can define data formats as described in Table 5.

TABLE 5

| Field Name | Field Data Type | Field Description |
|---|---|---|
| ContentBase | String | Defines a format for representing a content base of the content. ContentID, ContentBase, and ContentLocation allow referencing between MIME sections. This can be used to allow URLs in HTML bodies to reference attached content. |
| ContentDescription | String | Defines a format for representing a description that may accompany the content. For electronic mail messages, this value may have come from the Content-Description: header. Some legacy clients use Content Description for the recommended filename. |
| ContentID | String | Defines a format for representing a content entity ID of the content. Content-ID, Content-Base, and Content-Location allow referencing between MIME sections. This can be used to allow URLs in HTML bodies to reference attached content. |
| ContentType | String | Defines a format for representing a Content-Type of the content. For electronic mail messages, this can match the Content-Type header field for the MIME section where the attachment came from. For other types of electronic messages, this content type can best match the content of the content. For example: The Content-Type could be 'audio/mp3' and the MesaageContent could point to an Item in a Music schema, or to a.mp3 file containing, or to another Item that stores music data. Thus, the Content-Type give a standard indication of the data. This is a free form string. Applications can put their own types here, not just 'text/html' and other mime content types. |

TABLE 5-continued

| Field Name | Field Data Type | Field Description |
|---|---|---|
| ContentTypeParameters | String | Defines a format for representing parameters in the Content-Type header. Parameters are of the format 'attribute = value' and can be separated by a ';'. May contain a filename. |
| IsMacBinary | Booelan | Defines a format for indicating whether the attachment is a Mac Binary. This can facilitate special processing for Mac binaries. |
| MimeURL | String | Defines a format for representing a MIME path. A MimePath: URL of the form: MimePath:///[Level1]:[MultiPart-Type]/[Level2]:[MultiPart-Type]/ . . . / [Leveln]:[MultiPart-Type] |
| SuggestedFileName | String | Defines a format for representing the filename that is recommended to go with the content. The path can be omitted and this may just include the filename. For electronic mail messages, this value may have come from the Content-Type: 'name' parameter or the Content-Disposition-Filename or another location in the original email message. For example: 'Bill in Florida 2004.jpg' |

Figure 3:
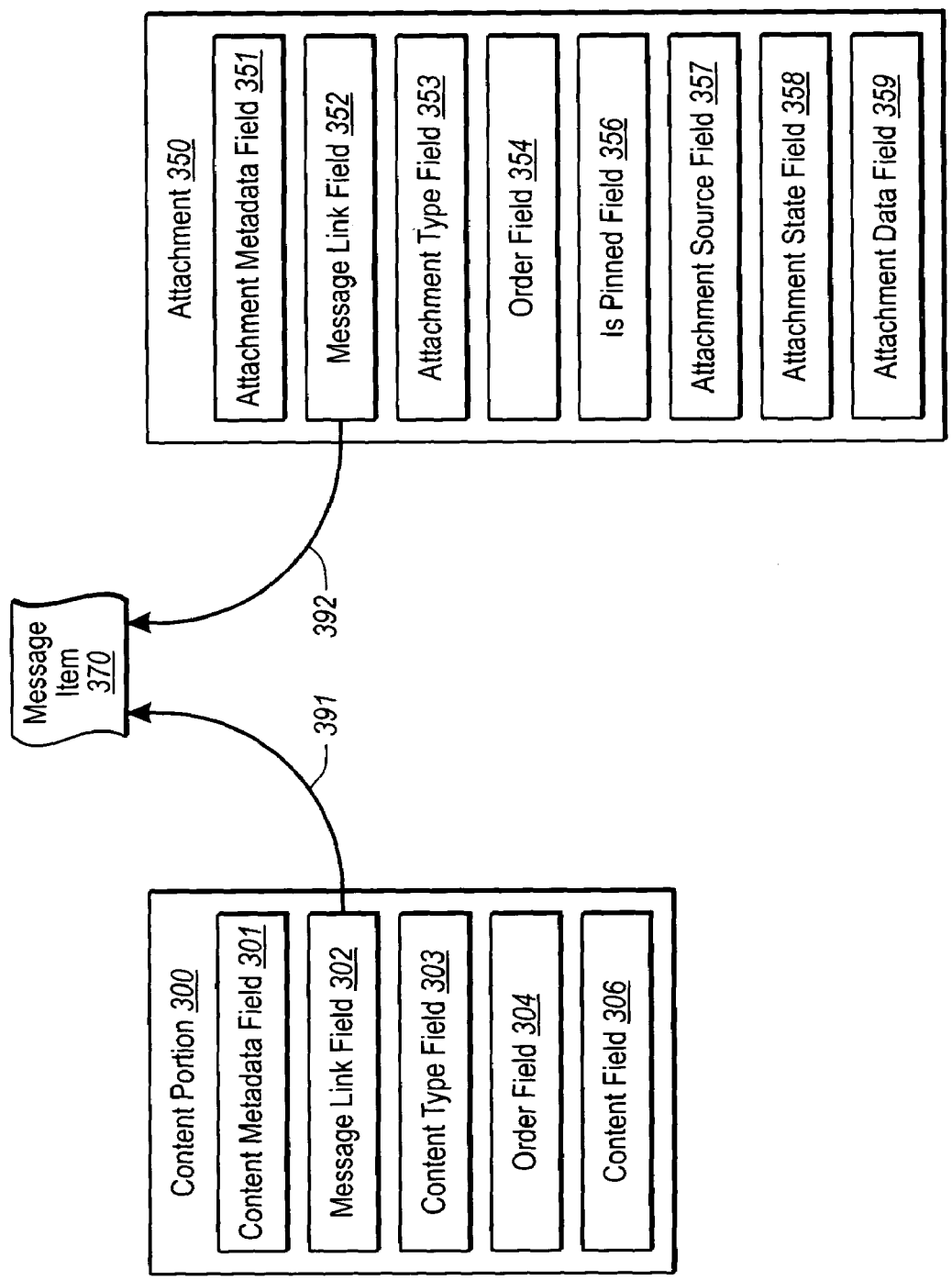
FIG. 3 illustrates an example of a content portion and an attachment independently linked to a message item in accordance with the principles of the present invention.

FIG. 3 illustrates an example of a content portion 300 and an attachment 350 linked to a message item 370 in accordance with the principles of the present invention. Content portion 300, attachment 350, and message item 370 can be formatted in accordance with schema hierarchy 150 (or the example portion of a more detailed schema hierarchy 200). Content portion 300 can include data fields formatted in accordance with a content schema, such as, for example, content schema 156 or content schema 216. Content metadata field 301 can include one or fields defined in accordance with a content properties schema, such as, for example, content properties schema 224. Message link field 302 can be assigned a message relationship representing a link from content portion 300 to an electronic message. For example, link 391 represents a link to message item 370. Message item 370 can be a message item defined in accordance with a message schema, such as, for example, message schema 152 or message schema 212.

Content type field 303 can represent a content type corresponding content portion 300. Order field 304 can represent an order corresponding to content portion 300. Content field 306 can represent message data (e.g., a body of an electric mail message) corresponding to content portion 300. Link 391 represents that content field 306 contains a portion of content corresponding to message item 370.

Attachment 350 can include fields formatted in accordance with an attachment schema, such as, for example, attachment schema 157 or attachment schema 218. Attachment metadata field 351 can include one or more fields defined in accordance with a content properties schema, such as, for example, content properties schema 224. It may also be that attachment metadata field includes or more fields defined in accordance with a message schema. The one or more fields can store data similar to that stored in message item 370. Thus, if attachment 350 persists after message item 370 is deleted (and content portion 300 is deleted), attachment 350 may be identified in response to a message related query that would have identified message item 370 if message 370 had not been deleted. Accordingly, a user may be provided with an attachment context (e.g., who sent the attachment, when was the attachment received, etc.) even if the electronic message containing such information has been deleted.

Message link field 352 can be assigned a message relationship representing a link from message attachment 350 to an electronic message. For example, link 392 represents a link to message item 370. Attachment type field 353 represents the attachment type (e.g. word processing document, music document, etc.) Order field 354 can represent an order corresponding to attachment 350. IsPinned field 356 represents whether attachment 350 is coupled to or decoupled from message item 370. When attachment 350 is decoupled from message item 370, attachment 350 can persist after message item 370 is deleted. On the other hand, when attachment 350 is coupled to message item 370, attachment 350 can be deleted along with content portion 300 when message item 370 is deleted.

Attachment source field 357 can be assigned a relationship representing a link to a database item where the message attachment 350 was accessed. Attachment state field 358 represents the state of attachment 350. Attachment data field 359 can represent attachment data (e.g., the contents of an MP3 document) corresponding to message attachment 350. Link 392 can represent that attachment data field 359 contains data that corresponds to message item 370.

Figure 4:
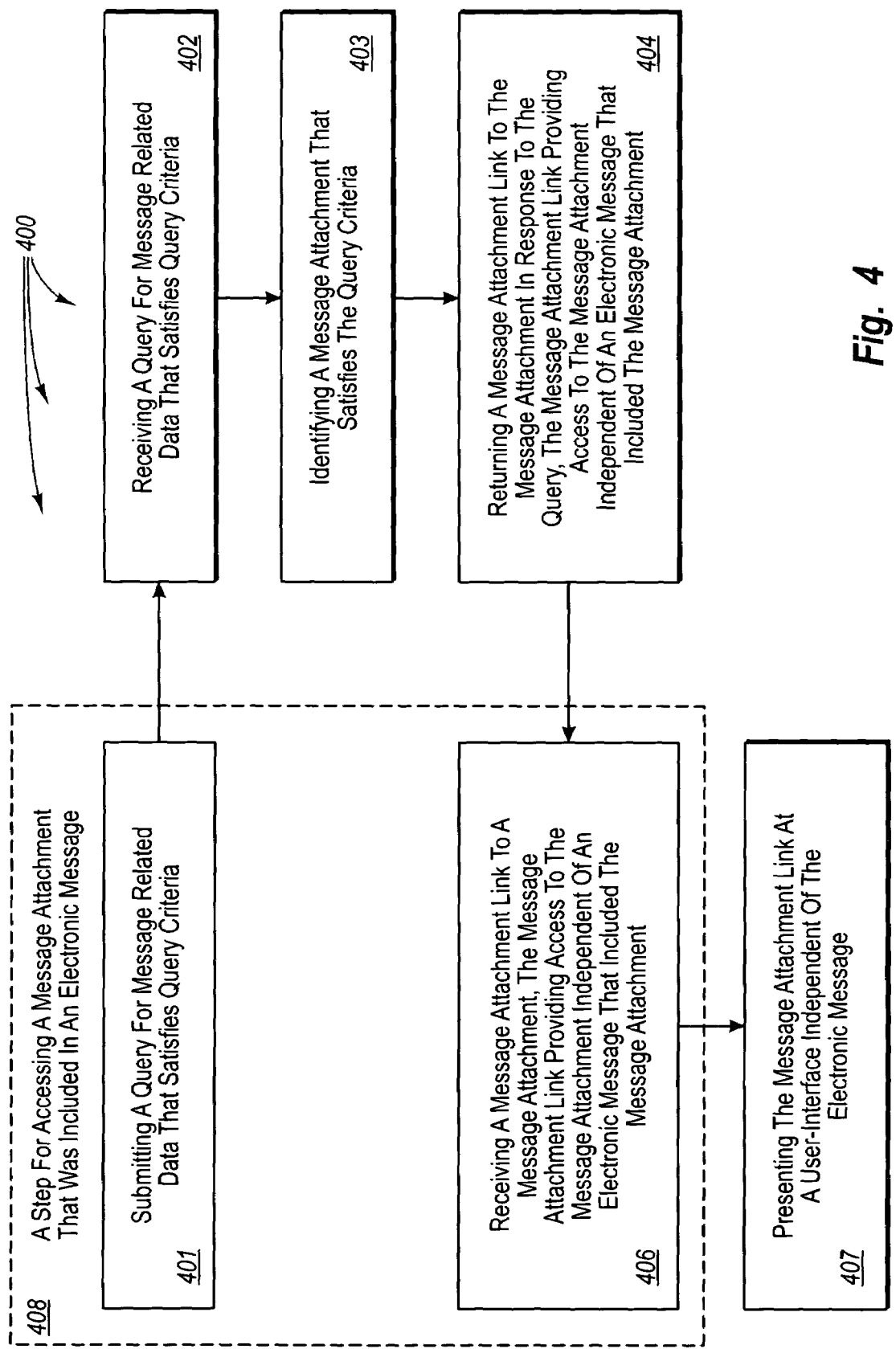
FIG. 4 illustrates an example flowchart of a method for presenting a message attachment independent of electronic messages at a user-interface.

FIG. 4 illustrates an example flowchart of a method for presenting a message attachment independent of electronic messages at a user-interface. The method of FIG. 4 will be described with respect to the components of network architecture 100 and the data structures of FIG. 3. The method 400 includes a step for accessing a message attachment that was included in an electronic message (step 408). Step 408 can include any corresponding acts for accessing a message attachment that was included in an electronic message.

However, in the method 400, step 408 includes a corresponding act of submitting a query for message related data that satisfies query criteria (act 401). For example, message application 104 can submit query 176 to computer system 109. Query 176 can be virtually any type of query. In some embodiments, query 176 is a request for new message related data that has been received at computer system 109 since the last time message application 104 queried for new messages. Alternately, in other embodiments, query 176 can include criteria, such as, for example, sender, recipient, date and time ranges, size, and subject of message related data. Further, query 176 can include query criteria querying for specified values within attachment metadata or indicating that (e.g., only) message attachments are being queried. Query criteria can be received from an input device (e.g., a mouse or keyboard) or remotely from another computer system.

Method 400 includes an act of receiving a query for message related data that satisfies query criteria (act 402). For example, database application 111 can receive query 176 from computer system 102. When appropriate, database application 111 can convert query 176 into an appropriate database access command. Computer system 109 can then submit the database access command to database 114. The database access command can include appropriate database instructions for implementing query 176.

Method 400 includes an act of identifying a message attachment that satisfies the query criteria (act 403). For example, database application 111 can identify that attachment 172 satisfies the query criteria of query 176 independent of values in data fields of message item 170 and content 171. Database application 111 can compare values of query criteria to values in an attachment metadata field (e.g., similar to attachment metadata field 351), or other data fields, for example, defined in accordance with content schema 216, attachment schema 218, or content properties schema 224, to make such a determination. For example, database application 111 may determine that an author value (e.g., representing an author of an attachment) in an attachment metadata field satisfies query criteria for message related data having a specified author.

Alternately, database application 111 can determine that attachment 172 was received subsequent to message application 104's last query for new messages or that query 176 was a query for message attachments.

Method 400 includes an act of returning a message attachment link to a message attachment in response to the query (act 404). For example, in response to query 176, database application 111 can return message attachment link 173 (a link to attachment 172) to computer system 102. Message attachment link 173 can be a Uniform Resource Locator ("URL") (e.g., similar to MimeURL defined in content properties schema 224) or some other type of Uniform Resource Identifier ("URI") (e.g., similar to ContentID as defined in content properties schema 224 or AttachmentSource as defined in attachment schema 218), that when provided back to database application 111, indicates a request to access attachment 172. Thus, link message attachment 173 provides access to attachment 172 independent of message item 170 and content 171.

In the method 400, step 408 includes a corresponding act of receiving a message attachment link to a message attachment (act 406). For example, message application 102 can receive message attachment link 173 (a link to attachment 172) from computer system 109. As previously described, message attachment link 173 provides access to attachment 172 independent of message item 170 and content 171.

Method 400 includes an act of presenting the message attachment link at a user-interface independent of the electronic message (act 407). For example, user-interface 177 can present message attachment link 173 (e.g., as an icon or hyperlink) independent of links to message item 170 and content 171. A user can select message attachment link 173 (e.g., by clicking on a representative icon or hyperlink) to access attachment 172. Message attachment link 173 can be selected to access attachment 172 without first having to access message item 170 or content 171. Thus, a user can access attachment 172 more efficiently without first having to click through message item 170 or content 171.

In response to selecting message attachment link 173, attachment 172 can be returned and presented at user-interface 177. For example, message attachment link 173 can be submitted back to and received at database application 111. In response to receiving message attachment link 173, database application 111 can transfer attachment 172 to computer system 102. Message application 104 can receive attachment 172 and user-interface 177 can present attachment 172 to a user.

Thus, an attachment (e.g., attachment 172) can be identified and presented at a user-interface (e.g., in response to a query) independent of an electronic message that included the attachment.

It may be that attachment 172 includes one or more data fields defined in accordance with schemas on schema hierarchy 200. The one or more data fields can store metadata corresponding to attachment 172, such as, for example, attachment size, date of creation, author, version, properties, etc. In some embodiments, application 111 can retrieve values from data fields of message item 170 and/or content 171 and populate an attachment data fields with the retrieved values (e.g., sender, recipients, delivery time, etc.). Thus, attachment 172 may include values for properties of message item 170 and/or content 171. Accordingly, database application 111 can also provide attachment metadata to message application 104 for presentation at user-interface 177.

Presenting metadata (or message related data) from attachment data fields can provide a user of computer system 102 with context for a message attachment. For example, a user of computer system 102 can identify an entity that sent attachment 172, when attachment 172 was created, or even the Subject of the electronic message that originally included attachment 172 (without having to provide a link to or display the electronic message).

Figure 5:
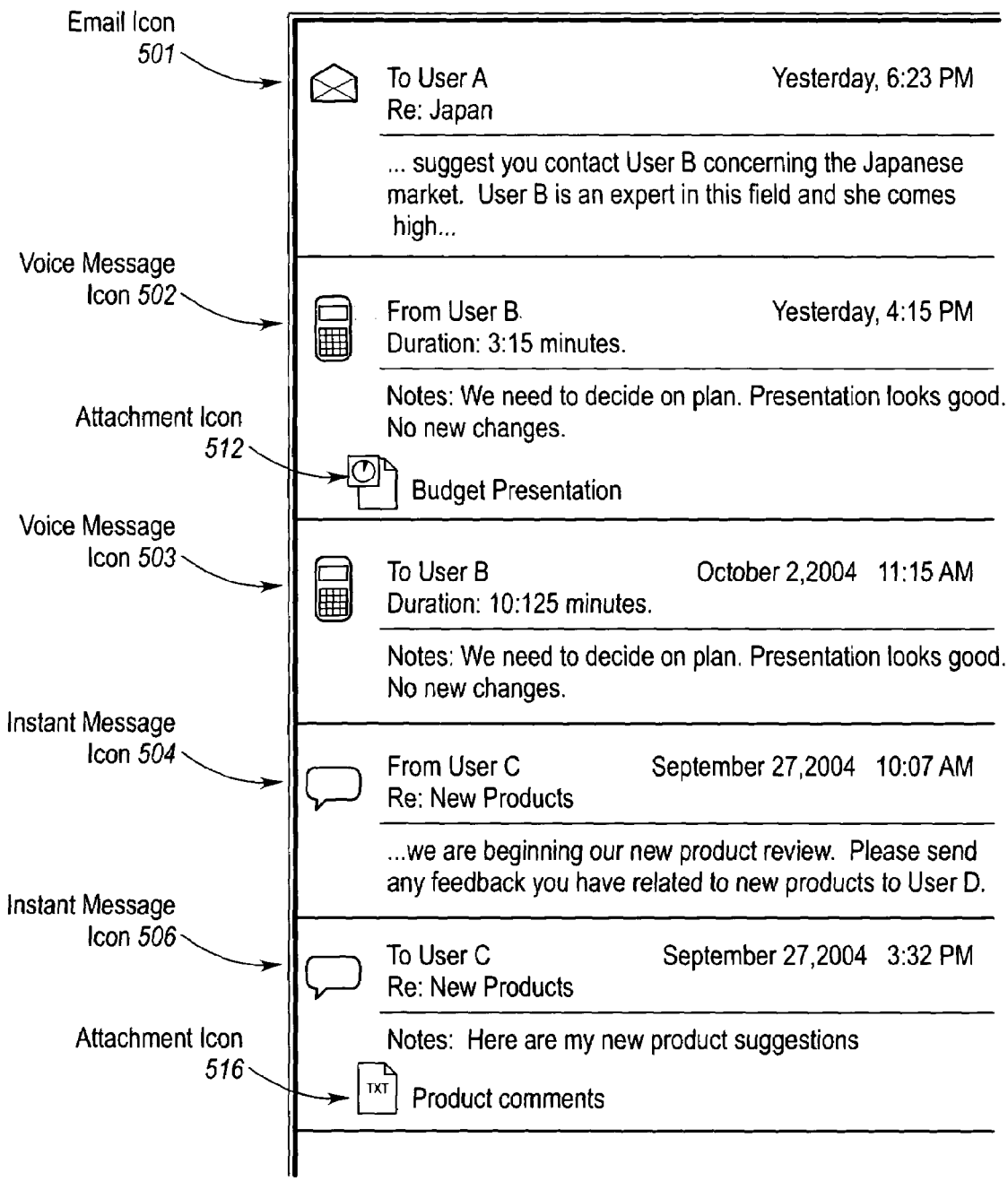
FIG. 5 illustrates a first example user-interface display that presents message attachments independent of electronic messages.

FIG. 5 illustrates a first example user-interface display (e.g., generated by user-interface 177) that presents message attachments independent of electronic messages. As depicted in the display, links to various different types of electronic messages are presented. For example, e-mail icon 501 provides a link to a corresponding electronic mail message, voice message icons 502 and 503 provide links corresponding voice mail messages, and instant message icons 504 and 506 provide links to corresponding instant messages. Further, attachment icons 512 and 516 provide independent links to corresponding attachments. Attachment icons 512 and 516 can be selected to access the attachments without first having to select voice message icon 502 and instant message icon 506 respectively. Accordingly, the corresponding attachments can be viewed as first class objects within the user-interface. The user-interface display is an example of a mixed mode presentation of attachments and messages.

Figure 6:
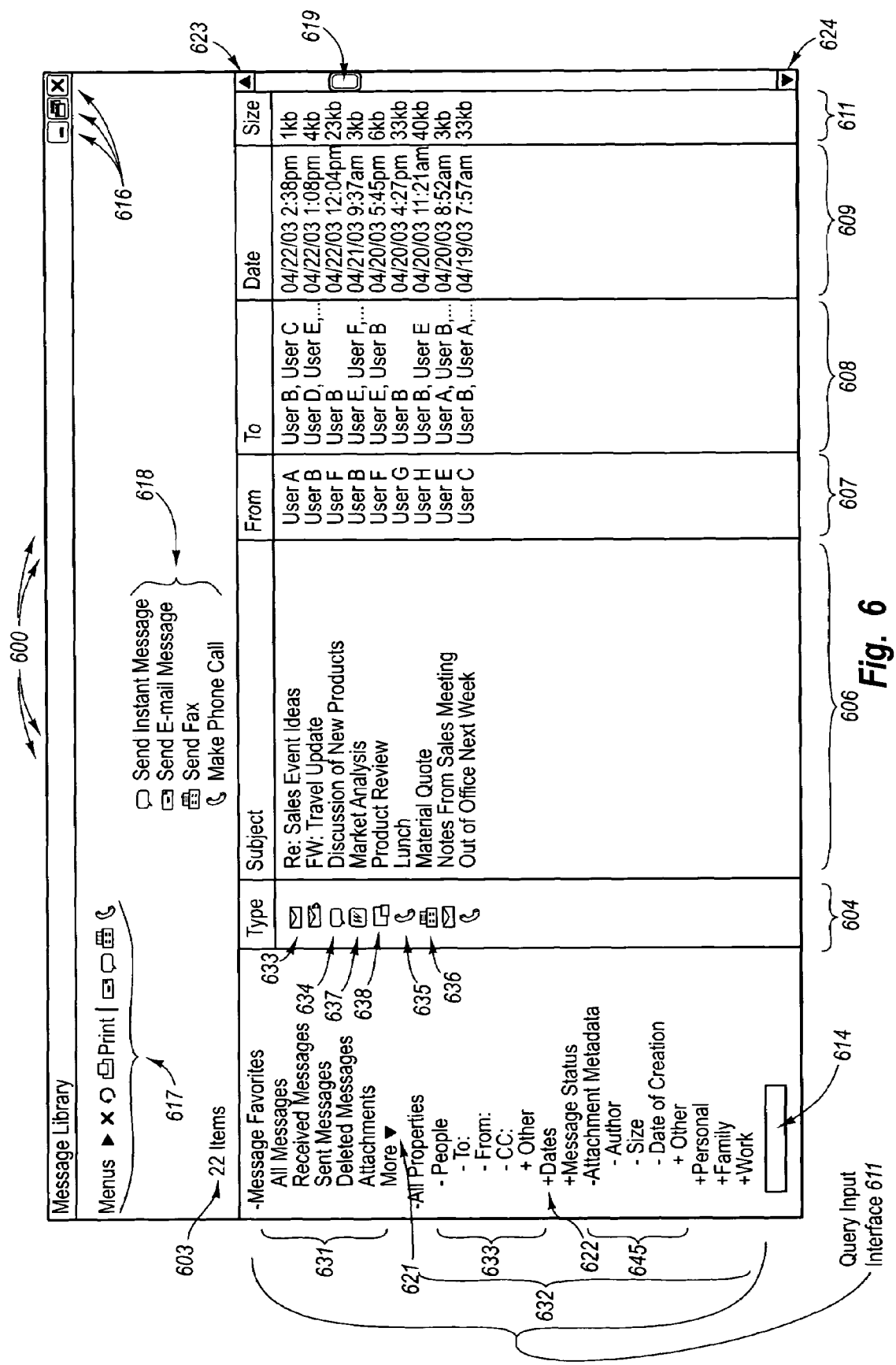
FIG. 6 illustrates a second example user-interface display that presents message attachments independent of electronic messages.

FIG. 6 illustrates a second example user-interface display 600 (e.g., generated by user-interface 177) that presents message attachments independent of electronic messages. Display 600 depicts query input interface 611 that can receive query criteria used to query for message related data. Query input interface 611 can receive query criteria related to Message Favorites 631, such as, for example, related to all messages, received messages, sent messages, deleted messages, attachments, etc. A user can manipulate an input device (e.g., a mouse) to select one or more items, such as, for example, attachments, in Message Favorites 631. Selecting an item in Message Favorites 611 can cause query input interface 611 to receive query criteria. For example, a user can select "Attachments" (e.g., by "clicking" on Attachments) to cause query input interface 611 to receive query criteria used to search for attachments.

A user can manipulate an input device to select down arrow 621, which may reveal additional message favorites. These additional message favorites can be selected to cause query input interface 611 to receive other and/or additional query criteria. Query criteria received as a result of selecting items in Message Favorites 611 can be used to search for message related data values contained in message items and attachments. For example, received query criteria can be used to search for message items and attachments have data fields defined in accordance with schema hierarchy 150 (or schema hierarchy 200) and/or stored in message silo 184 and document silo 186.

Query input interface 611 can also receive query criteria related to All Properties 632, such as, for example, related to message participants, message dates, message status, personal messages, family messages, work messages, attachment metadata 645, etc. A user can manipulate an input device to select one or more items corresponding to All Properties 632. For example, a user can select Attachment Metadata 645 to cause query input interface 611 to receive query criteria used to search for attachment metadata (e.g., in data fields defined in accordance with attachment schema 218).

All Properties 632 may be arranged as a hierarchical tree of properties. A user can manipulate an input device to reveal or hide lower level properties. It may be that a user selects a "+" associated with a higher level property to reveal corresponding lower level properties. For example, a user can select +622 to reveal lower level selectable Date properties (e.g., sent dates and received dates). On the other hand, a user may select a "−" associated with a higher level property to hide corresponding lower level properties. Lower level properties 633 are an example of the results of selecting a + associated with the People property. As depicted, the lower level properties, "To", "From", "CC", etc., are revealed. Lower level properties depicted in lower level properties 633 can include additional lower level properties. For example, selecting the + associated with the "Other" lower level property (in lower level properties 633) may reveal lower level properties below the Other lower level property.

A user can manipulate an input device to select properties of different levels from All Properties 632. Properties can be selected to cause query input interface 611 to receive other and/or additional query criteria. Query criteria received as a result of selecting items in All Properties 611 can be used to search for message related data values contained in message items. For example, received query criteria can be used to search for message items that have data fields defined in accordance with schema hierarchy 150 (or schema hierarchy 200) and/or stored in message silo 184 or document silo 186.

Input field 614 can receive query criteria for querying for keywords included in messages and attachments. A user can manipulate an input device (e.g., a keyboard) to enter text into input field 614. Query criteria received as a result of entering text into input field 614 can be used to search for message related data values contained in messages and attachments. For example, received query criteria can be used to search for messages and/or attachments having data fields defined in accordance with schema hierarchy 150 (or schema hierarchy 200) and/or stored in message silo 184 or documents silo 186.

It should be understood that combined query criteria, including query criteria associated with Message Favorites 631 (including attachments) and/or query criteria associated with All Properties 632 (including attachment metadata 645) and/or query criteria entered at input field 614, can be received. Combined query criteria can result when a plurality of items is selected from Message Favorites 631 or All Properties 632. Combined query criteria can also result when one or more items from Message Favorites 631 are combined with one or more items from All Properties 632. Further, combined query criteria can results when one or more items from Message Favorites 631 or one or more items from All Properties 632 are combined with text entered at input field 614.

Thus, query criteria can be more coarse resulting in broader queries and more results. For example, query criteria indicating Attachments (entered by selecting "Attachments" from Message Favorites 631) from a specified user (entered by selecting "From" from All Properties 632) may result in an increased number of results. On the other hand, query criteria can be more granular resulting in narrower queries and fewer results. For example, a query criteria indicating all JPEG Attachments from family members (entered by selecting "Attachments" from Message Favorites 611, selecting "Family" and Attachment Metadata 645 from all All Properties 632, and further selecting Type=JPEG within Attachment Metadata 645) may result in fewer results. Accordingly, query criteria can be flexibly received to meet the needs of a user.

Query input interface 611 expressly depicts controls for receiving some of the different types of query criteria that can be used to search for message related data (e.g. messages and attachments). However, it should be understood that a query input interface can receive query criteria (including other types of query criteria in addition to those that can be received at query input interface 611) for searching for virtually any value from any message or attachment data field, including searching for values from messages data field and attachment data fields defined in accordance with a schema hierarchy. For example, a query input interface can receive query criteria for searching values of any message data fields or attachment data fields defined (e.g., a participants field, subject field, etc.) in accordance with schema hierarchy 150 or schema hierarchy 200.

Still Referring to FIG. 6, display 600 depicts an example of display links to attachments independent of electronic messages. Depicted in display 600 are type column 604, subject column 606, from column 607, to column 608, date column 609, and size column 611. Type column 604 displays an indication of a type of message related data. Different icons can be displayed to represent different types of message related data, such as, for example, different types of electronic messages and attachments. For example, envelope icon 633 can represent electronic mail messages, text bubble icon 634 can represent instant messages document icon 637 can represent a word processing document, telephone icon 635 can represent voice mail messages graphics icon 638 can represent an image, and fax machine icon 636 can represent fax messages. Other types of icons can also be displayed to represent other types of messages, such as, for example, news group postings, blog entries, etc. and other types of attachments, such as, for example, presentations, spreadsheets, etc.

A user can select an icon representing an electronic message or attachment to view the content of the electronic message or attachment. For example, a user can select document icon 637 to view the contents of the represented word processing document (without having to first access the electronic message that included the word processing document). Thus, document icon 637 essentially functions as a link to the contents of the represented word processing document independent of the electronic message that includes or included the word processing document.

Selecting document icon 637 can cause a request for the represented word processing document to be submitted to a database, such as, for example, database 114. In response to the request, the database can return the contents of the represented word processing document. The contents can be then be displayed at the user-interface. Alternately, an appropriate application can be initiated in response to a received portion of message related data. For example, when a word processing document is received, a word processing application can be initiated to receive and present the word processing document.

Subject column 306 indicates the subject of message related data corresponding to an icon in message type column 604. From column 607 indicates an entity that sent the message related data corresponding to an icon in message type column 604. To column 608 represents the recipients of the message related data corresponding to an icon in message type column 604. Date column 609 represents the date the message related content corresponding to an icon in message type column 604 was sent. Size column 611 represents the size of the message related content corresponding to an icon in message type column 604.

It may be that all received portions message related content cannot be displayed simultaneously. A user can manipulate slider control 619 to scroll up and/or down to reveal additional portions of message related content. A user can also select up arrow 623 to scroll up and down arrow 624 to scroll down. Boxes from among boxes 616 can be selected to minimize, maximize, re-size, or close display 600. Indicator 603 indicates the number or portions of message related data received in response to query.

Message menu 617 indicates message operations that can be initiated through display 600. For example, a user can close, forward, or print currently selected electronic message or attachment. A user can also select an appropriate icon from message menu 617 to initiate an electronic mail message, an instant message, a fax message, or a phone call. Message list 618 indicates message types that can be used to respond to a displayed message. A user can select an appropriate icon to respond to a displayed message with a specified type of message. For example, a user could select the fax icon from message list 618 to respond to a voice mail message (e.g., represented by telephone icon 635) with a fax message.

Figure 7:
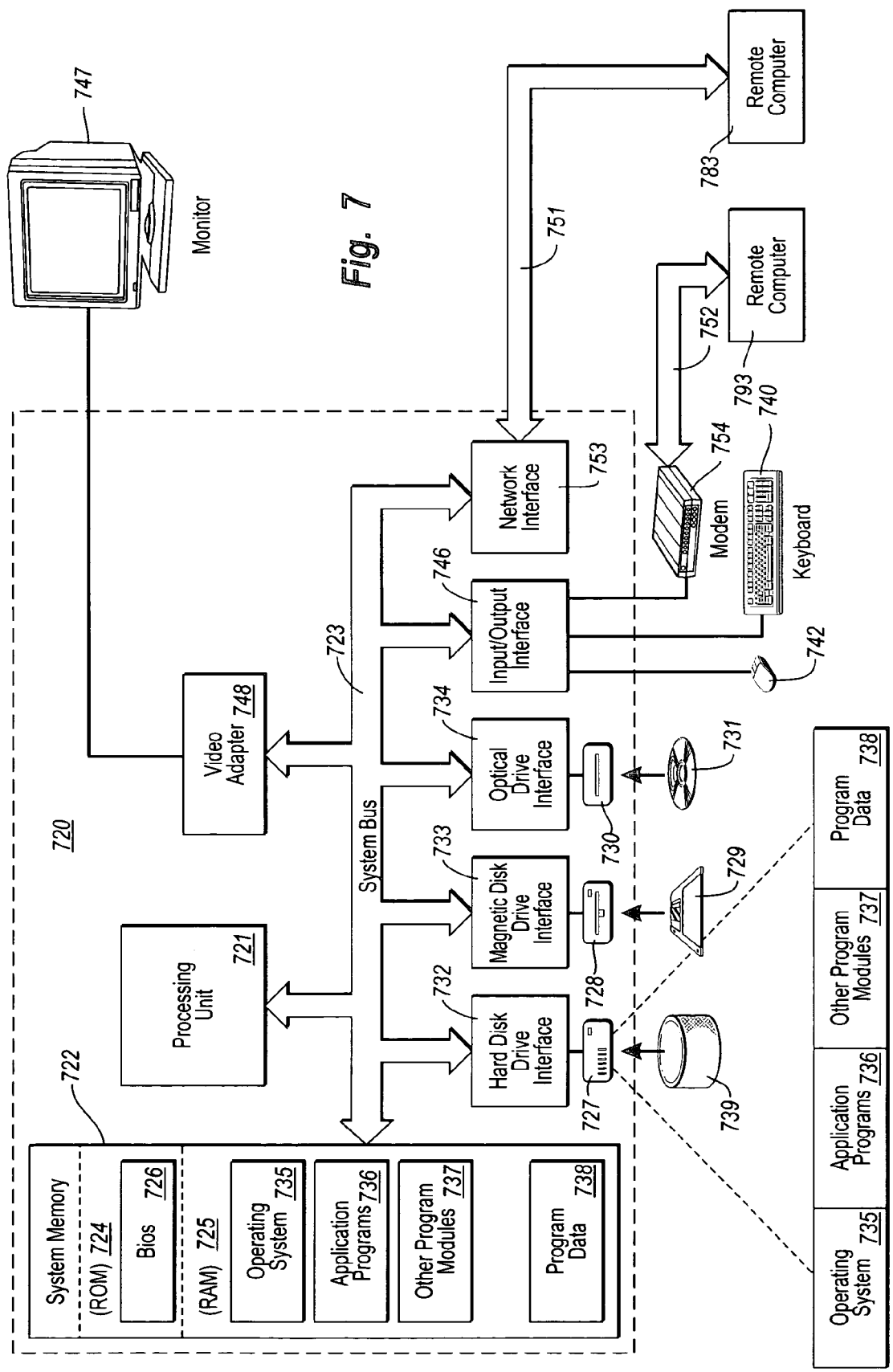
FIG. 7 illustrates a suitable operating environment for the principles of the present invention.

FIG. 7 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 7, an example system for implementing the invention includes a general-purpose computing device in the form of computer system 720, including a processing unit 721, a system memory 722, and a system bus 723 that couples various system components including the system memory 722 to the processing unit 721. Processing unit 721 can execute computer-executable instructions designed to implement features of computer system 720, including features of the present invention. The system bus 723 may be any of several types of bus structures including a memory bus or memory controller, a peripheral bus, and a local bus using any of a variety of bus architectures. The system memory includes read only memory ("ROM") 724 and random access memory ("RAM") 725. A basic input/output system ("BIOS") 726, containing the basic routines that help transfer information between elements within computer system 720, such as during start-up, may be stored in ROM 724.

The computer system 720 may also include magnetic hard disk drive 727 for reading from and writing to magnetic hard disk 739, magnetic disk drive 728 for reading from or writing to removable magnetic disk 729, and optical disk drive 730 for reading from or writing to removable optical disk 731, such as, or example, a CD-ROM or other optical media. The magnetic hard disk drive 727, magnetic disk drive 728, and optical disk drive 730 are connected to the system bus 723 by hard disk drive interface 732, magnetic disk drive-interface 733, and optical drive interface 734, respectively. The drives and their associated computer-readable media provide non-volatile storage of computer-executable instructions, data structures, program modules, and other data for the computer system 720. Although the example environment described herein employs magnetic hard disk 739, removable magnetic disk 729 and removable optical disk 731, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 739, magnetic disk 729, optical disk 731, ROM 724 or RAM 725, including an operating system 735, one or more application programs 736, other program modules 737, and program data 738. A user may enter commands and information into computer system 720 through keyboard 740, pointing device 742, or other input devices (not shown), such as, for example, a microphone, joy stick, game pad, scanner, or the like. These and other input devices can be connected to the processing unit 721 through input/output interface 746 coupled to system bus 723. Input/output interface 746 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 747 or other display device is also connected to system bus 723 via video interface 748. Speakers or other audio output device is also connected to system bus 723 via an audio interface. Other peripheral output devices (not shown), such as, for example, printers, can also be connected to computer system 720.

Computer system 720 is connectable to networks, such as, for example, an office-wide or enterprise-wide computer network, a home network, an intranet, and/or the Internet. Computer system 720 can exchange data with external sources, such as, for example, remote computer systems, remote applications, and/or remote databases over such networks.

Computer system 720 includes network interface 753, through which computer system 720 receives data from external sources and/or transmits data to external sources. As depicted in FIG. 1, network interface 753 facilitates the exchange of data with remote computer system 783 via link 751. Network interface 753 can logically represent one or more software and/or hardware modules, such as, for example, a network interface card and corresponding Network Driver Interface Specification ("NDIS") stack. Link 751 represents a portion of a network (e.g., an Ethernet segment), and remote computer system 783 represents a node of the network.

Likewise, computer system 720 includes input/output interface 746, through which computer system 720 receives data from external sources and/or transmits data to external sources. Input/output interface 746 is coupled to modem 754 (e.g., a standard modem, a cable modem, or digital subscriber line ("DSL") modem), through which computer system 720 receives data from and/or transmits data to external sources. As depicted in FIG. 7, input/output interface 746 and modem 754 facilitate the exchange of data with remote computer system 793 via link 752. Link 752 represents a portion of a network and remote computer system 793 represents a node of the network.

While FIG. 7 represents a suitable operating environment for the present invention, the principles of the present invention may be employed in any system that is capable of, with suitable modification if necessary, implementing the principles of the present invention. The environment illustrated in FIG. 7 is illustrative only and by no means represents even a small portion of the wide variety of environments in which the principles of the present invention may be implemented.

In accordance with the present invention, database applications, message applications, and user-interfaces as well as associated data, including schemas, message items, content, attachments, message silos, document silos, and queries may be stored and accessed from any of the computer-readable media associated with computer system 720. For example, portions of such modules and portions of associated program data may be included in operating system 735, application programs 736, program modules 737 and/or program data 738, for storage in system memory 722.

When a mass storage device, such as, for example, magnetic hard disk 739, is coupled to computer system 720, such modules and associated program data may also be stored in the mass storage device. In a networked environment, program modules depicted relative to computer system 720, or portions thereof, can be stored in remote memory storage devices, such as, system memory and/or mass storage devices associated with remote computer system 783 and/or remote computer system 793. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computer system that is network connectable along with one or more other computer systems to a network, a method for presenting a message attachment at a user interface, the message attachment presented independent of message item content previously corresponding to the message attachment, and even when the message item content is deleted, the method comprising:

an act of presenting a user interface, the user interface including a unified query interface configured to receive query criteria for simultaneously querying data from any of a plurality of different silos in a database, the database including at least a message silo and a separate document silo, the message silo configured to store message item content contained in electronic messages, the separate document silo configured to store message item attachments attached to electronic messages such that message item attachments are stored separately from previously corresponding message item content, the database further storing attachment metadata that at least links message item attachments to electronic messages;

an act of receiving user input at the unified query interface, the user input representing query criteria;

an act of submitting the query criteria to the database to simultaneously query the plurality of silos for data that satisfies the query criteria, the query further submitting a query for specified values within attachment metadata;

an act of receiving at the user interface a plurality of different portions of data representing data that satisfies the query criteria from any of the plurality of silos and the attachment metadata, the plurality of portions of data including at least a message attachment link to a message attachment, the message attachment originally contained in an electronic message along with message item content when received at the database, the message attachment subsequently separated from the electronic message for storage in the document silo, the attachment metadata linking the message attachment to the electronic message; and an act of presenting the plurality of portions of data including the message attachment link at the user interface, the message attachment link providing direct access to the message attachment independent of the electronic message such that the message attachment can be accessed in response to a data query even after the electronic message is deleted and it can be determined that the message attachment was originally contained in the electronic message even after the electronic message is deleted.

2. The method as recited in claim 1, wherein the act of submitting the query criteria comprises an act of submitting a request for new message related data.

3. The method as recited in claim 1, wherein the act of submitting a query for specified values within attachment metadata comprises an act of submitting a query for specified values within attachment metadata wherein the attachment metadata is selected from among an author, a size, a date of creation, an content type, properties, a sender, recipients, and a subject.

4. The method as recited in claim 1, wherein the act of submitting the query criteria comprises an act of submitting a query for message attachments.

5. The method as recited in claim 1, wherein the act of submitting the query criteria comprises an act of submitting a query to a database application that controls access to documents stored in the document silo.

6. The method as recited in claim 1, wherein the act of receiving a message attachment link to a message attachment comprises an act of receiving a Uniform Resource Identifier that identifies the message attachment.

7. The method as recited in claim 6, wherein the act of receiving a Uniform Resource Identifier comprises an act of receiving a Uniform Resource Locator that indicates the location of the message attachment.

8. The method as recited in claim 1, wherein the act of presenting the message attachment link at the user interface independent of the electronic message comprises an act of presenting a mixed mode display of message attachment links and electronic message links.

9. The method as recited in claim 1, wherein the act of presenting the message attachment link at the user interface independent of the electronic message comprises an act of presenting a hyperlink to the message attachment.

10. The method as recited in claim 1, wherein the act of presenting the message attachment link at the user interface independent of the electronic message comprises an act of presenting an icon representing the message attachment.

11. The method as recited in claim 1, farther comprising:

an act of receiving an indication that the presented message attachment link was selected at the user interface;

an act of submitting the message attachment link to a database application that controls access to documents in the document silo in response to the indication;

an act of receiving the message attachment from the database, the message attachment having been accessed from the documents silo without accessing the message silo; and an act of presenting the contents of the message attachment at the user interface such that the message attachment is presented independent of the electronic message that originally contained the message attachment.

12. In a computer system that is network connectable along with one or more other computer systems to a network, the computer system including a database application for controlling access to a database, the database including a plurality of silos for separately storing different types of data, including at least a message silo and a separate document silo, the message silo configured to store message item content contained in electronic messages, the separate document silo configured to store message item attachments attached to electronic messages such that message item attachments are stored separately from previously corresponding message item content, the database further storing attachment metadata that at least links message item attachments to electronic messages, a method for providing access to a message attachment that can be presented independent of electronic messages at a user interface when an electronic message previously corresponding to the message attachment is deleted, the method comprising:

an act of receiving query criteria from a unified query interface at one of the other computer systems, the query criteria representing a query for data contained in the database, the unified query interface contained within a user interface at the other computer system, the unified query interface configured to receive query criteria for simultaneously querying data from any of a plurality of different data silos of the database, including the message silo and the separate document silo, and also including specified values within attachment metadata that at least links message item attachments to electronic messages;

an act of identifying data in the database that satisfies the query criteria, the data identified from a plurality of different silos and the attachment metadata, the identified data including at least a message attachment identified from the document silo, the message attachment originally contained in an electronic message along with message item content when the received at the database, the message attachment subsequently separated from the electronic message for storage in the document silo; and an act of returning a plurality of portions of data to the unified query interface in response to the represented query, the plurality of portions of data representing the data that satisfied the query criteria, the plurality of portions of data at least including a message attachment link to the message attachment, the message attachment link providing direct access to the message attachment independent of the electronic message that originally contained the message attachment such that the message attachment can presented separately from the electronic message at the user interface, the message attachment can be accessed separately at the user interface, and it can be determined that the message attachment was originally contained in the electronic message even after, the electronic message is deleted.

13. The method as recited in claim 12, wherein the act of receiving query criteria comprises an act of receiving a request for new message related data.

14. The method as recited in claim 12, wherein the act of receiving a query for specified values within attachment metadata comprises an act of receiving a query for specified values within attachment metadata wherein the attachment metadata is selected from among an author, a size, a date of creation, an content type, properties, a sender, recipients, and a subject.

15. The method as recited in claim 12, wherein the act of receiving query criteria comprises an act of receiving a query for message attachments.

16. The method as recited in claim 12, wherein the act of receiving query criteria comprises an act of receiving a query for documents stored in a document silo.

17. The method as recited in claim 12, wherein the act of receiving query criteria comprises an act of receiving a query from a message application.

18. The method as recited in claim 12, wherein the act of identifying a message attachment that satisfies the query criteria comprises an act of comparing a value included in the received query criteria to a corresponding value in a data field of the message attachment.

19. The method as recited in claim 12, wherein the act of identifying a message attachment that satisfies the query criteria comprises an act of determining that a value in an attachment metadata field matches received query criteria.

20. The method as recited in claim 12, wherein the act of identifying a message attachment that satisfies the query criteria comprises an act of determining that the attachment was received subsequent to a prior query for message related data.

21. The method as recited in claim 12, wherein the act of returning a message attachment link to the message attachment in response to the query comprises an act of returning a Uniform Resource Identifier that identifies the message attachment.

22. The method as recited in claim 21, wherein the act of returning a Uniform Resource Identifier that identifies the message attachment comprises an act of returning Uniform Resource Locator that indicates the location of the message attachment.

23. The method as recited in claim 12, further comprising:
an act of receiving the returned message attachment link back from the user interface, reception of the message attachment link indicative of a request for the message attachment;
an act of utilizing the message attachment link to access the message attachment directly from the document silo without having to access the message silo; and
an act of returning the message attachment to the user interface.

24. A computer program product for use in a computer system that is network connectable along with one or more other computer systems to a network, the computer program product for implementing a method for presenting a message attachment at a user interface, the message attachment presented independent of message item content previously corresponding to the message attachment, and even when the message item content is deleted, the computer program product comprising one or more computer-readable media having stored thereon computer executable instructions that, when executed by a processor, cause the computer system to perform the following:
present a user interface, the user interface including a unified query interface configured to receive query criteria for simultaneously querying data from any of a plurality of different silos in a database, the database including at least a message silo and a separate document silo, the message silo configured to store message item content contained in electronic messages, the separate document silo configured to store message item attachments attached to electronic messages such that message item attachments are stored separately from previously corresponding message item content, the database further storing attachment metadata that at least links message item attachments to electronic messages;

receiving user input at the unified query interface, the user input representing query criteria;

submit the query criteria to the database to simultaneously query the plurality of silos for data that satisfies the query criteria, the query further submitting a query for specified values within attachment metadata;

receive at a user interface a plurality of different portions of data representing data that satisfies the query criteria from any of the plurality of silos and the attachment metadata, the plurality of portions of data including at least a message attachment link to a message attachment, the message attachment originally contained in an electronic message along with message item content when received at the database, the message attachment subsequently separated from the electronic message for storage in the document silo, the attachment metadata linking the message attachment to the electronic message; and present the plurality of portions of data including the message attachment link at the user interface, the message attachment link providing direct access to the message attachment independent of the electronic message such that the message attachment can be accessed in response to a data query even after the electronic message is deleted and it can be determined that the message attachment was originally contained in the electronic message even after the electronic message is deleted.

25. The computer program product as recited in claim 24, wherein computer executable instructions that, when executed, cause the computer system to receive a message attachment link to a message attachment comprise computer executable instructions that, when executed, cause the computer system to receive a Uniform Resource Identifier that identifies the message attachment.

26. The computer program product as recited in claim 24, wherein computer executable instructions that, when executed, cause the computer system to present the message attachment link at user interface independent of the electronic message comprise computer executable instructions that, when executed, cause the computer system to present a mixed mode display of message attachment links and electronic message links.

27. A computer program product for use in a computer system that is network connectable along with one or more other computer systems to a network, the computer system including a database application for controlling access to a database, the database including a plurality of silos for separately storing different types of data, including at least a message silo and a separate document silo, the message silo configured to store message item content contained in electronic messages, the separate document silo configured to store message item attachments attached to electronic messages such that message item attachments are stored separately from previously corresponding message item content, the database further storing attachment metadata that at least links message item attachments to electronic messages the computer program product for implementing a method for providing access to a message attachment that can be presented independent of electronic messages at a user-interface when an electronic message previously corresponding the message attachment is deleted, the computer program product comprising one or more computer-readable media having stored thereon computer executable instructions that, when executed by a processor, cause the computer system to perform the following:

receive query criteria from a unified query interface at one of the other computer systems, the query criteria representing a query for data contained in the database, the unified query interface contained within a user interface at the other computer system, the unified query interface configured to receive query criteria for simultaneously querying data from any of a plurality of different data silos of the database, including the message silo and the separate document silo, and also including specified values within attachment metadata that at least links message item attachments to electronic messages;

identify data in the database that satisfies the query criteria, the data identified from a plurality of different silos and the attachment metadata, the identified data including at least a message attachment identified from the document silo, the message attachment originally contained in an electronic message along with message item content when the received at the database, the message attachment subsequently separated from the electronic message for storage in the document silo; and return a plurality of portions of data to the unified query interface in response to the represented query, the plurality of portions of data representing the data that satisfied the query criteria, the plurality of portions of data at least including a message attachment link to the message attachment, the message attachment link providing direct access to the message attachment independent of the electronic message that originally contained the message attachment such that the message attachment can presented separately from the electronic message at a user interface, the message attachment can be accessed separately at the user interface, and it can be determined that the message attachment was originally contained in the electronic message even after, the electronic message is deleted.

28. The computer program product as recited in claim 27, wherein computer executable instructions that, when executed, cause the computer system to identify a message attachment that satisfies the query criteria comprise computer executable instructions that, when executed, cause the computer system to compare a value included in the received query criteria to a corresponding value in a "data field of the message metadata.

29. The computer program product as recited in claim 27, wherein computer executable instructions that, when executed, cause the computer system to return a message attachment link to the message attachment in response to the query comprise computer executable instructions that, when executed, cause the computer system to return a Uniform Resource Identifier that identifies the message attachment.

* * * * *